April 13, 1943.   W. H. HARRIS, JR   2,316,422
EXTERNAL HONING TOOL
Filed April 7, 1941   4 Sheets-Sheet 1
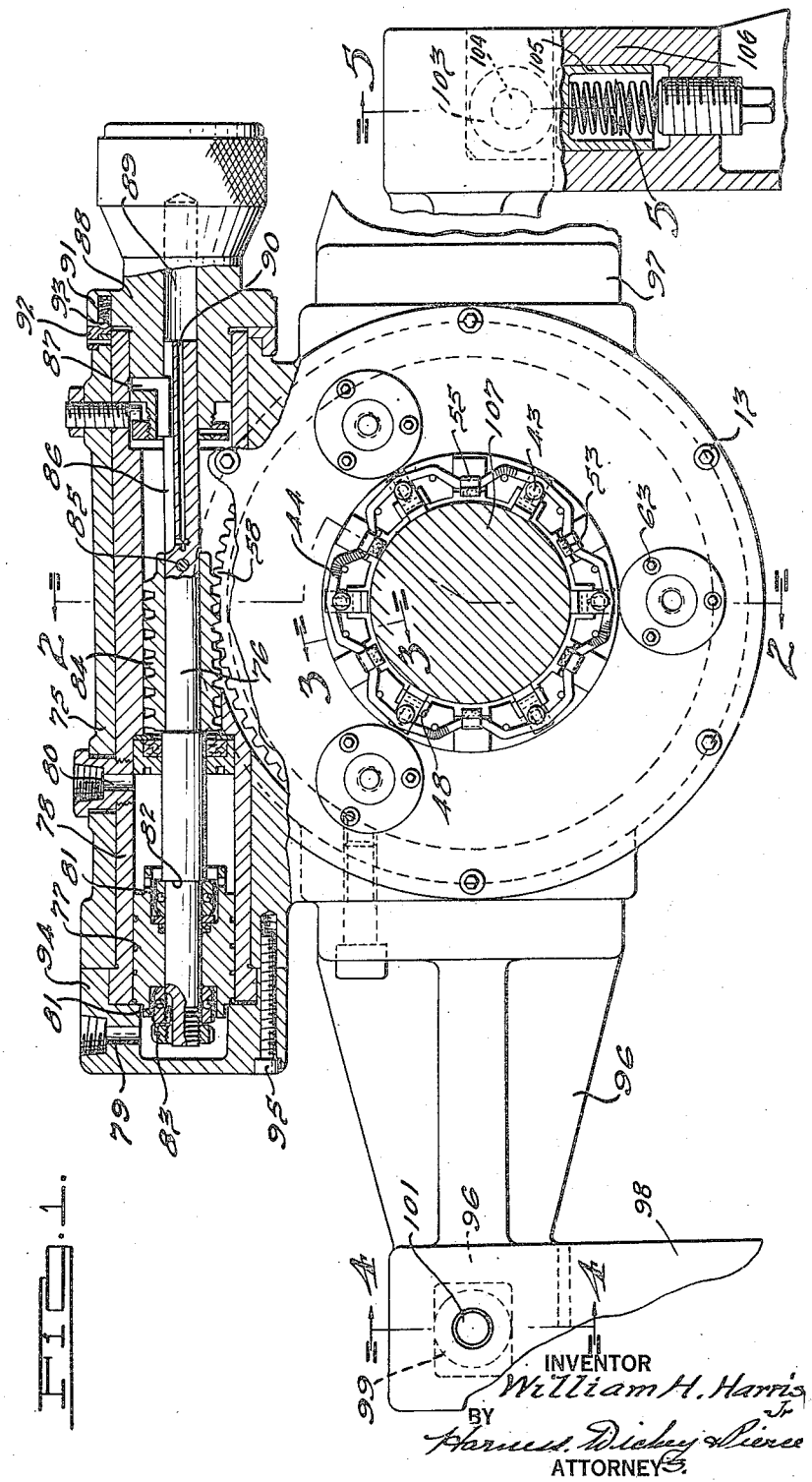
INVENTOR
William H. Harris, Jr.
BY
Harness, Dickey & Pierce
ATTORNEYS

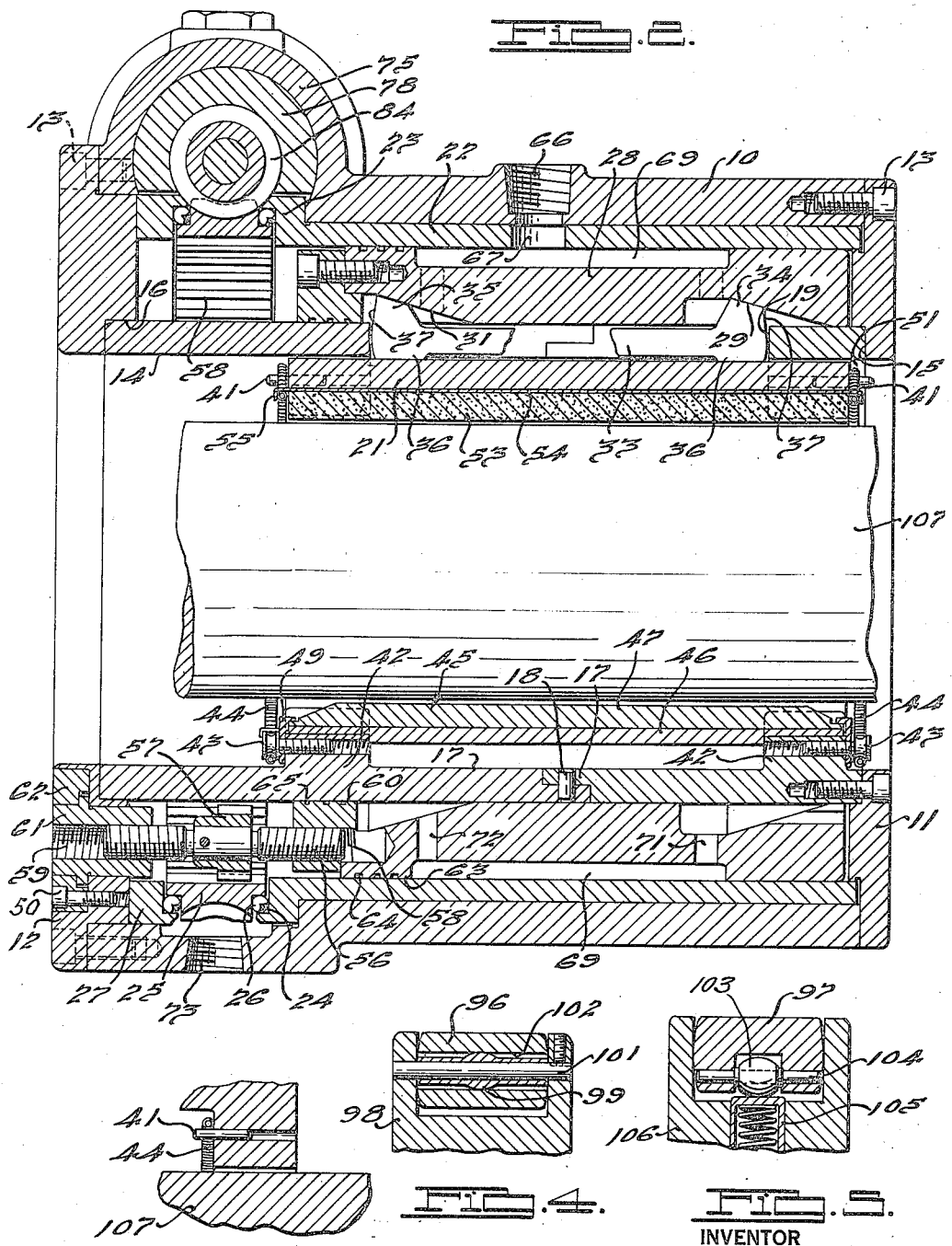

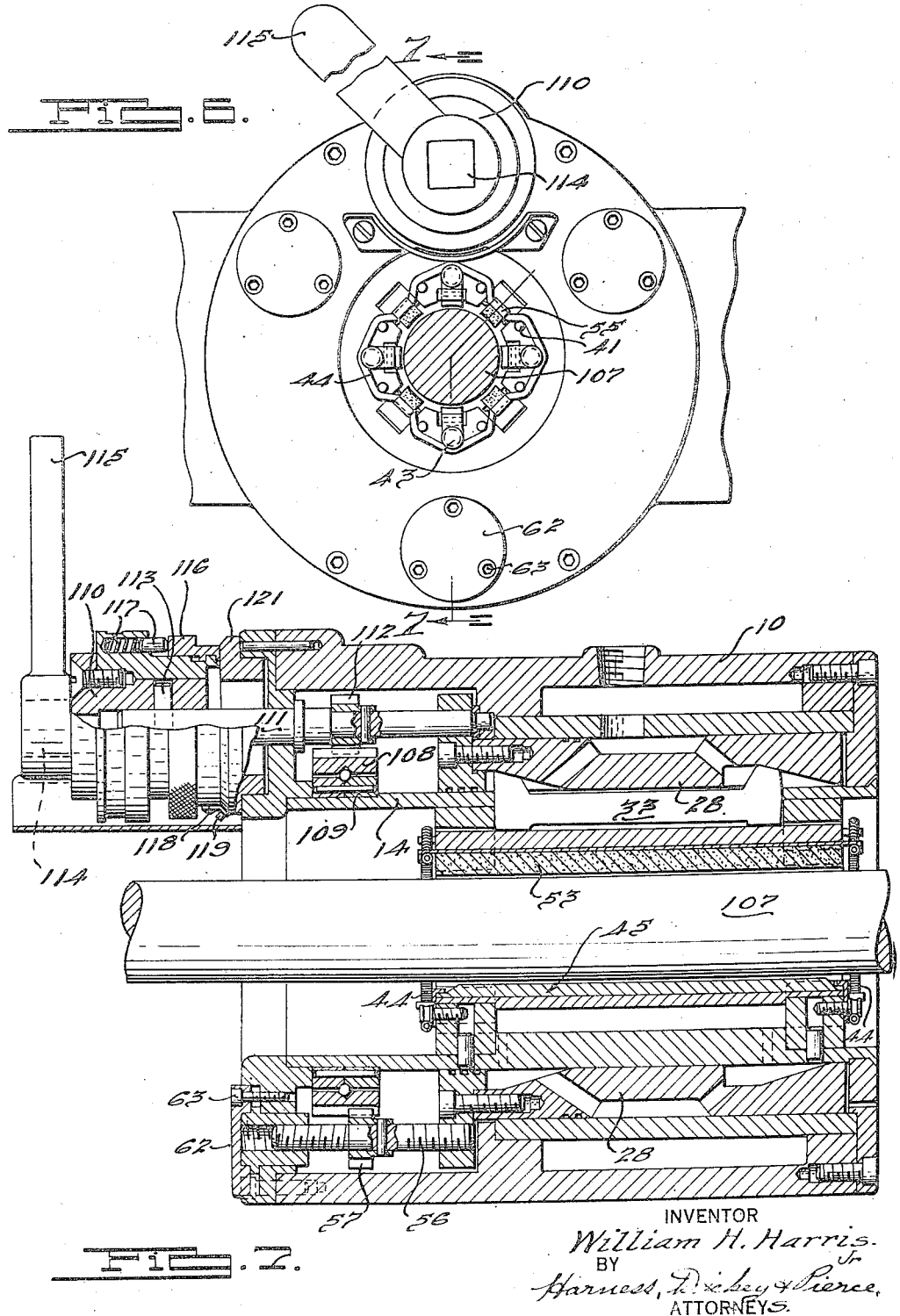

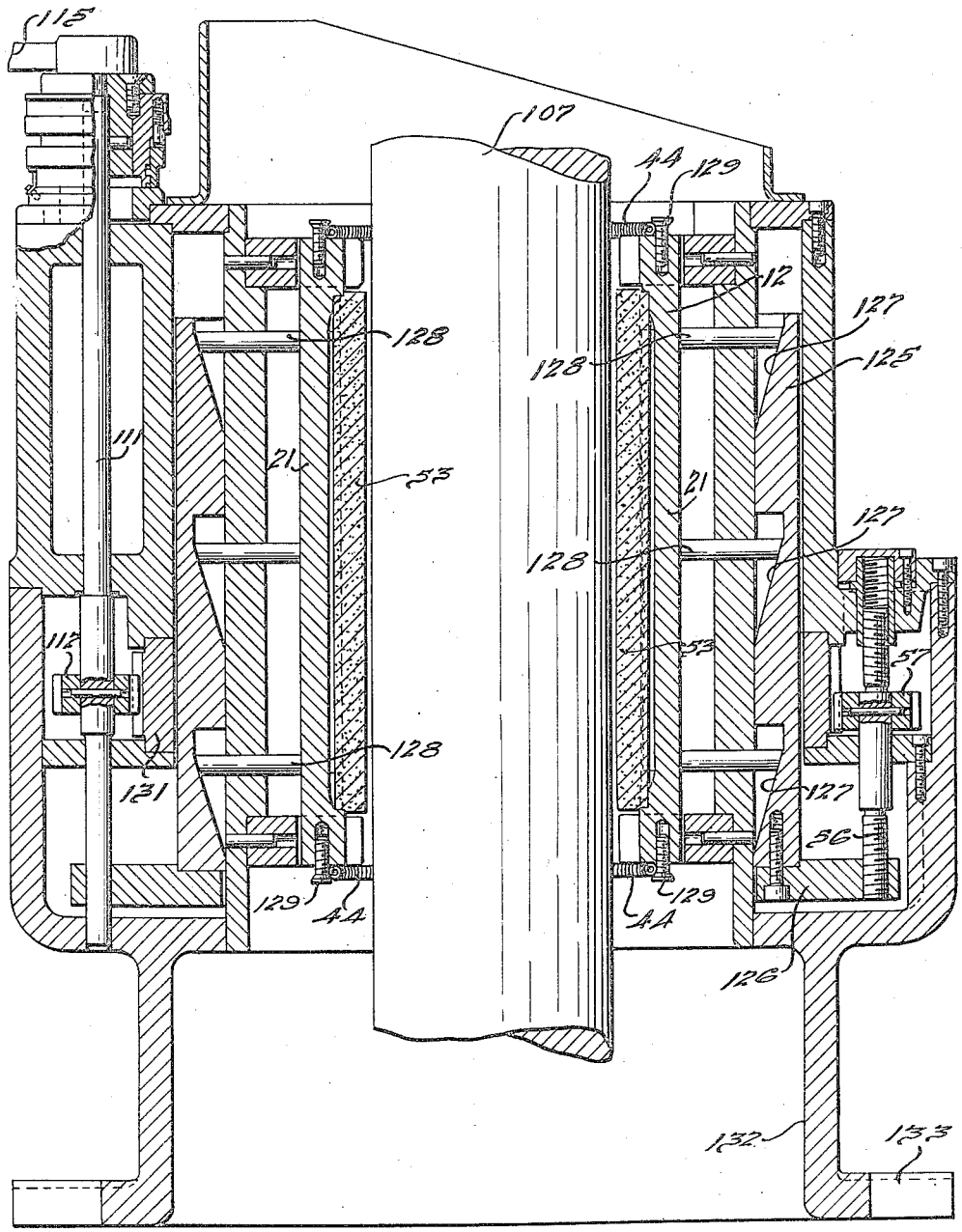

Patented Apr. 13, 1943

2,316,422

UNITED STATES PATENT OFFICE 2,316,422

EXTERNAL HONING TOOL

William H. Harris, Jr., Detroit, Mich., assignor to Micromatic Hone Corporation, Detroit, Mich., a corporation of Michigan Application April 7, 1941, Serial No. 387,170

11 Claims. (Cl. 51—184.3)

My invention relates to honing tools, and particularly to a honing tool of the internal type employed for machining the external surface of cylindrical objects.

While heretofore abrasive stones have been mounted on the interior surface of a body to form a tool for machining the exterior surfaces of cylindrical bodies, the present tool is unique in being compact, accurately adjustable over a wide range as well as during the operating cycle. The hone is preferably mounted in a unique manner to have it completely laterally floating as the work is rotated and reciprocated therethrough. A plurality of pinions are operated by a worm, or spiral, gear from a worm which is axially movable to function as a rack for rapidly advancing or retracting the worm wheel. A fluid actuated piston is employed for moving the worm axially, to thereby rapidly expand and contract the abrading stones. Pinions in engagement with the internal gear portion of the worm wheel are mounted on studs having left and right hand threads so as to double the longitudinal movement of the cams mounted thereon when the pinions are actuated. The cams are engaged by floating shoes which permit the abrading stones to tilt while being adjusted radially inwardly to engage the cylindrical surface. It is within the purview of my invention to employ a ratchet and stop mechanism to operate the internal gear to expand and contract the abrasive stones.

Accordingly, the main objects of my invention are; to provide a honing tool for finishing the exterior surface of cylinders, which is compact; to provide a honing tool for machining exterior cylindrical surfaces which has a simple, balanced mechanism for moving the abrading stone in small increments of advancement; to provide a honing tool with means for incrementally advancing the abrading stone and also advancing the abrasive stone a major amount; to provide a worm and worm wheel for driving pinions which moves cam elements for adjusting the abrasive stones of a honing tool by movement of the worm longitudinally and rotationally; to provide means for rotating the worm for producing micrometric advancement of the abrasive stones and for shifting the worm longitudinally to effect a major advancement of the stones; to provide mounting means for a honing tool which machines the exterior surface of a cylindrical object, which permits the tool as a whole to float relative to the workpiece which is machined thereby; and in general, to provide a honing tool for exterior surfaces which is compact, simple in construction, and positive in operation.

Other objects and features of novelty of my invention will be specifically pointed out or will become apparent when referring for a better understanding of my invention, to the following description taken in conjunction with the accompanying drawings, wherein:

Figure 1 is a plan view, with parts in section and parts broken away, of a honing tool embodying features of my invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is a reduced sectional view of the structure illustrated in Fig. 1, taken on the line 4—4 thereof;

Fig. 5 is a reduced sectional view of the structure illustrated in Fig. 1, taken on the line 5—5 thereof;

Fig. 6 is a plan view of structure, similar to that illustrated in Fig. 1, showing a modified form of my invention;

Fig. 7 is an enlarged sectional view of the structure illustrated in Fig. 6, taken on the line 7—7 thereof;

Fig. 8 is an enlarged sectional view of structure, similar to that illustrated in Figs. 2 and 7, showing a further form which my invention may assume.

In Figs. 1 to 5 I have illustrated a tool for machining the exterior surface of cylindrical objects, as comprising a cylindrical casing 10 provided with end plates 11 and 12 which are secured thereto by bolts 13. An inner sleeve 14 is mounted between the shoulders 15 and 16 in the peripheral edge of the inner aperture of the end plates 11 and 12 respectively. The sleeve 14 may be made of two parts, as illustrated in Fig. 2, the sections 17 being retained as a unit by pins 18 to facilitate slotting and machining. A plurality of slots 19 are provided in the wall of the sleeve 14, radially disposed relative to each of the abrasive stone holders 21 of the tool. An additional sleeve 22 is disposed adjacent to the inner wall of the outer housing 10, having a shoulder 23 on the end adjacent to the plate 12, which forms a portion 24 of the raceway for a worm wheel 25 which is mounted on balls 26 disposed in the raceway and in a raceway 27 which is retained in position by the end plate 12.

Between the sleeves 14 and 22 an axially movable camming ring 28 is mounted, having cam faces 29 and 31 throughout the inner periphery. Within the slots 19, cam plates 33 are mounted, having cam ends 34 and 35 mating with the cam surfaces 29 and 31 of the ring 28. Opposite to the cam surfaces 34 and 35, the plate 33 is provided with projections 36, which engage the rear face of the stone carriers 21, for the purpose of moving the carriers 21 radially, as the ring 28 is moved axially. It will be noted that the end portions 37 of the cam plates 33 are of arcuate shape for the purpose of permitting the stone holders 21 and the plates to relatively tilt a slight amount while eliminating any friction to the radial movement of the plate. The annular projection 42 of the inner surface of the sleeve 14 is provided with concave headed screws 43 for receiving a garter spring 44 which extends about pins 41 also supported on the projection.

Wiper guides 45, having a metal backing member 46 and a facing element 47 of fabric, fiber, lead, or the like, are supported in slots 48 cut in the inner periphery of the annular projections 42 retained in position by clips 49, secured in position by screws 43. Additional slots 51 are provided in the annular projection 42 between the wiper guides 45 for receiving the stone holders 21. Stones 53 are mounted on a metal backing element 54 secured by friction, adhesive material, or other suitable means to form a unit element. The ends of the backing elements 54 are bent inwardly forming the hook 55 over which the garter spring 44 is disposed in such relation to the pins 41 as to bias the stone holders 21 and the stones 53 against the cam plates 36.

The annular camming element 28 is supported on studs 56 having a left and right hand thread on its opposite ends. The central portion of the stud is secured to a pinion gear 57, the teeth of which mate with the teeth of a ring gear 58 cut in the inner periphery of the worm gear 25. A plurality of studs and pinion gears are employed, herein illustrated as three in number. One of the ends of each stud 56 is threaded into apertures 58 in the annular camming elements 28 while the opposite end is threaded in the stem 59 in the elements 61 which are secured to the end plate 12 by the shouldered washers 62 retained in position by screws 50. By employing opposite handed threads on the ends of studs 56, the movement of the annular camming ring 28 is doubled for each rotation of a thread of the studs. It will be noted that the inner ring gear 58 has teeth which are longer than the teeth on the pinion 57 permitting the pinion to shift axially relative to the ring gear due to the axial movement of the studs 56.

When the worm wheel 25 and inner ring gear 58 are revolved, the pinions 57 are rotated, causing the axial movement of the annular cam element 28 toward and away from the elements 61. Such motion produces the radial movement of the plate 33 and therefore the abrading stone 53. When the annular camming element 28 is moved to the left, as viewed in Fig. 2, the garter spring 44 moves the abrasive elements and the plates 33 inwardly to retain the cam ends 34 and 35 thereof in engagement with the cam surfaces 29 and 31 on the inner face of the cam element 28.

The face 63 of the annular cam ring 28, which engages the inner surface of the sleeve 22, is provided with a plurality of annular slots or oil grooves, while the inner face of the cam ring 28 is likewise provided with slots or oil grooves 65 on that portion of the face which engages the outer surface of the sleeve 14. Passageways 66 and 67 in the outer housing 10 and the sleeve 22, permits the introduction of a coolant, preferably oil, into an annular passage 69 provided in the outer face of the annular cam ring 28. A plurality of passageways 71 and 72 provide communication between the passageway 69 and the annular cam surfaces 29 and 31 from which the coolant flows into the slots 19 about the abrasive stone 53. The coolant which escapes past the faces 60 and 63 on the annular ring 58 will lubricate the worm, the pinion 57, the ring gear 58, and the bearings 26. The excess oil will flow from the left hand end of the tool through the threaded aperture 73 and is conducted back to the coolant tank of the machine.

Tangentially disposed relative to the casing 10 is a tubular casing 75, having a shaft 76 mounted therein for rotational and axial movement. A piston 77 is mounted on the left hand end of the shaft, as viewed in the figure, within a cylinder 78 into which a fluid is introduced to one or the other end of the piston, through apertures 79 and 80. Ball bearings 81 are mounted between the shaft and the piston to permit the turning of the shaft independently of the piston. The bearings are mounted against a shoulder 82 on the shaft and are retained in position by a nut 83 on the shaft end to have the shaft move axially with the piston in either direction. Intermediate the shaft ends, a worm 84 is mounted, being fixed thereto by a pin 85.

The right hand end of the shaft, as viewed in Fig. 1 is provided with a keyway 86 in which an L-shaped key 87 is mounted in the adjustable knob 88, and prevents the shaft from turning when moved axially and permits the knob to turn the shaft and therefore the worm 84 when adjustment by the knob is made. An aperture 89 in the knob receives the end of the shaft 76, to which the coolant is introduced through a passageway 90. The flange 91 of the knob rests upon an index collar 92 in which a plurality of notches are provided for receiving a spring pressed ball 93 in the flange 91 to retain the knob in adjusted position relative to the index collar 92. The opposite end of the housing 75 is enclosed by a cap 94, which is retained in position by a plurality of screws 95.

In the tool illustrated in Figs. 1 to 5, arms 96 and 97 extend laterally of the housing 10, parallel to the cylinder 75. The arm 96 is mounted in a bifurcated support 98 on a roller 99, mounted on a shaft 101. The roller 99 has a central ball portion on which the end of the arm 96 may tilt to permit free floating movement of the arm. The slot 102 with which the roller 99 engages is elongated to permit the axial shifting of the tool on the roller. The opposite end of the arm is provided with a ball like roller 103, mounted on a shaft 104, to rest upon a spring-pressed plunger 105 in a bifurcated support 106. The arm 97 is permitted to move axially, as well as vertically, while tilting in any position so that the tool is universally movable in any direction a limited amount.

The supports 98 and 106 are preferably mounted vertically so that the tool bore is horizontal to operate on a horizontally disposed shaft. A solid shaft 107 is herein illustrated as being accurately honed by the tool embodied in my invention.

The shaft is driven in rotation and moved axially while the tool is held for universal movement. In other applications the work is rotated while the tool is reciprocated. In still other applications the work is reciprocated and rotated while the tool is slowly reciprocated.

Fluid means is preferably employed to rapidly advance the abrasive stones into contact with the surface of the shaft 107. The piston may be adjusted to strike the end of the cylinder to regulate the degree of advancement of the stones. Thereafter, a rotary movement is applied to the shaft through the operation of the knob 88 to advance the stones and machine the shaft to a predetermined diameter. The stones may be adjusted to contact the wall when moved by the pistons and to continue to machine under fluid pressure when the pistons are adjusted to remain out of contact with the end of the cylinder. After the honing operation is completed, a reversal of the flow of fluid will produce a retraction of the stone to permit the shaft to be moved from the tool.

In Fig. 7 I have illustrated a similar tool, having a ratchet mechanism which is manually adjusted to attain the expansion and contraction of the abrasive stones. A ring gear 108 forms a bearing on the split inner race 109 which is attached to the sleeve 14. Pinions 57, herein illustrated as being three in number, are in mesh with the ring gear and are supported on the stud 56, having right and left hand threads on the ends. A shaft 111 carries a pinion 112 which drives the ring gear 108. A head 112 is secured to the shaft by a pin 113, the head having a square end 114 which is engaged by a ratchet wrench 115. A ring 116 is mounted on the head 112 for rotation relative thereto to be retained in fixed relation therewith by a plunger and spring 117 which is retained in an aperture in the head. A stop finger 118 is disposed on the outside of the sleeve 116 in position to be engaged by a stop element 119 mounted on a fixed collar 121. As the honing operation progresses the ratchet wrench 115 is operated at predetermined times to turn the shaft 111 and therefore, the pinion 112 which operates the ring gear 108, the pinions 57 and studs 56 to move the annular cam ring 28 while moving the abrasive stones 53 radially. By setting the ring 116 relative to the head 110, the advancement of the stones is interrupted when the finger 118 contacts the stop element 119.

In Fig. 8 I have illustrated a somewhat different form of device, that wherein a cam ring 125 is mounted on a washer-like plate 126 on the end of the tool opposite from that on which the ratchet handle 115 is mounted. The cam ring 125 is provided with three cam surfaces 127, operating on pins 128 for moving the stone carriers 12 towards the axis of the tool. The stones are fixed to the carriers and the carriers have extending screws 129, with which the garter springs 44 engage for urging the stone carriers towards the pin 128. The rotation of the shaft 111 operates the pinion 112 for driving a ring gear 131 which rotates the plurality of pinions 57 and the studs 56 for moving the plate 126 axially of the tool. In the tool illustrated, an annular support 132 is provided at one end of the tool, having a flange 133 by which the tool may be clamped to a bed or carriage. The operation of the tool is otherwise similar to that illustrated in Figs. 1 to 7.

While I have described and illustrated several embodiments of my invention, it will be apparent to those skilled in the art, that various changes, omissions, additions, and substitutions may be made therein without departing from the spirit and scope of my invention, as set forth in the accompanying claims.

What is claimed is:

1. A honing tool having a plurality of abrasive stones, cam means for adjusting said stones radially, axially shiftable rotational means for producing the contraction of said stones, and a piston for moving said rotational means axially to increase the rate of contractive movement.

2. A honing tool comprising a plurality of abrasive elements, a worm wheel, pinions driven by said worm wheel, a cam element into which the pinions are threaded which is movable by the rotation of said pinions, an axially shiftable worm for rotating said worm wheel, and a cylinder having a piston for axially moving said worm.

3. A honing tool comprising a plurality of abrasive elements, a worm wheel, pinions driven by said worm wheel, a cam element into which the pinions are threaded which is movable by the rotation of said pinions, an axially shiftable worm for rotating said worm wheel, a cylinder having a piston for axially moving said worm, means for limiting the movement of said piston, and means by which the worm may thereafter be rotated.

4. A tool for grinding the external surfaces of a cylinder including a housing, a cam element movable axially therein, a plurality of abrasive stones carried by the body movable radially by said cam element, a plurality of pinions having stems threaded in said cam elements, a ring gear for operating said pinions for adjusting said cam element axially, and means for rotating said ring gear.

5. A tool for grinding the external surfaces of a cylinder including a housing, a unitary cam element movable axially therein, a plurality of abrasive stones carried by the body movable radially by said cam element, a plurality of pinions having stems threaded in said cam element, a ring gear for operating said pinions for adjusting said cam element axially, means for rotating said ring gear, a pinion engaging said ring gear, and a ratchet wrench by which said last pinion is operated.

6. A tool for grinding the external surfaces of a cylinder including a housing, a unitary cam element movable axially therein, a plurality of abrasive stones carried by the body movable radially by said cam element, a plurality of pinions having stems threaded in said cam element, a ring gear for operating said pinions for adjusting said cam element axially, means for rotating said ring gear, and a universally floating support for said tool.

7. A tool for grinding the external surfaces of a cylinder including a housing, a cam element movable axially therein, a plurality of abrasive stones carried by the body movable radially by said cam element, a plurality of pinions having stems threaded in said cam element, a worm wheel mounted in said housing, a ring gear on the inner side of said worm wheel contacting said pinions, and a worm for rotating said worm wheel.

8. A tool for grinding the external surfaces of a cylinder including a housing, a cam element movable axially therein, a plurality of abrasive stones carried by the body movable radially by said cam element, a plurality of pinions having stems threaded in said cam elements, a worm wheel mounted in said housing, a ring gear on the inner side of said worm wheel contacting said pinions, a worm for rotating said worm wheel, and a means for moving said worm axially.

9. In a honing tool, a housing, a cylindrical cam having a pair of spaced annular cam faces and axially movable in said housing, shoes within said cam, abrasive stones on said shoes, means for urging said stones and shoes against the surface of said cam, a ring gear, pinions driven by said ring gear and stems on said pinions threaded in said cam by which said cam is movable axially.

10. In a honing tool, a housing, a cylindrical cam axially movable in said housing, shoes within said cam, abrasive stones on said shoes, means for urging said stones and shoes against the surface of said cam, an internal gear having external worm teeth, pinions driven by the internal gear, studs carried by said pinions threaded in the cam unit, and a worm for driving said gear for moving said cam axially.

11. In a honing tool, a housing, a cylindrical cam axially movable in said housing, shoes within said cam, abrasive stones on said shoes, means for urging said stones and shoes against the surface of said cam, an internal gear having external worm teeth, pinions, driven by the internal gear, studs carried by said pinions threaded in the cam unit, a worm for driving said gear for moving said cam axially, and a means for moving said worm endwise for moving the gear a limited amount, and means by which said worm is turned to further move the gear.

WILLIAM H. HARRIS, Jr.